(12) United States Patent
Graves et al.

(10) Patent No.: US 10,661,211 B2
(45) Date of Patent: May 26, 2020

(54) FILTER HOLDING FRAME

(71) Applicant: American Air Filter Company, Inc., Louisville, KY (US)

(72) Inventors: Ronald W. Graves, New Bern, NC (US); Mitchell A. Karl, Greenville, NC (US)

(73) Assignee: AMERICAN AIR FILTER COMPANY, INC., Louisville, KY (US)

( * ) Notice: Subject to any disclaimer, the term of this patent is extended or adjusted under 35 U.S.C. 154(b) by 311 days.

(21) Appl. No.: 15/615,517

(22) Filed: Jun. 6, 2017

(65) Prior Publication Data

US 2018/0345193 A1    Dec. 6, 2018

(51) Int. Cl.
*B01D 46/12* (2006.01)
*B01D 46/00* (2006.01)
*A01K 1/00* (2006.01)

(52) U.S. Cl.
CPC ....... *B01D 46/0004* (2013.01); *B01D 46/001* (2013.01); *B01D 46/002* (2013.01); *B01D 46/0005* (2013.01); *B01D 46/0009* (2013.01); *B01D 46/0097* (2013.01); *B01D 46/12* (2013.01); *A01K 1/0047* (2013.01); *B01D 46/0013* (2013.01); *B01D 2265/028* (2013.01); *B01D 2271/00* (2013.01)

(58) Field of Classification Search
CPC .. B01D 46/0004; B01D 46/12; B01D 46/002; B01D 46/0005; B01D 46/0097; B01D 46/001; B01D 46/0009; B01D 46/0013; B01D 2265/028; B01D 2271/00; A01K 1/0047

USPC ......... 55/482, 483, 484, 493, 490, 495, 496, 55/501, 502, 507, 511, DIG. 31
See application file for complete search history.

(56) References Cited

U.S. PATENT DOCUMENTS

| | | | |
|---|---|---|---|
| 3,042,213 A | | 7/1962 | Bub |
| 3,460,322 A | * | 8/1969 | Rivers .................... B01D 46/00 55/484 |
| 3,912,308 A | * | 10/1975 | Persson .................. B01D 46/42 292/54 |
| 4,009,012 A | * | 2/1977 | Heffler ................... B01D 46/10 55/483 |
| 6,447,566 B1 | | 9/2002 | Rivera et al. |
| 8,105,409 B2 | * | 1/2012 | Mann ................. B01D 46/0005 55/483 |
| 8,491,689 B2 | | 7/2013 | Duffy et al. |
| 8,747,505 B2 | | 6/2014 | Crabtree et al. |
| 8,956,433 B2 | | 2/2015 | Sundvik et al. |

(Continued)

OTHER PUBLICATIONS

International Search Report and Written Opinion issued in Application No. PCT/US2018/036045 dated Oct. 10, 2018.

(Continued)

*Primary Examiner* — Minh Chau T Pham
(74) *Attorney, Agent, or Firm* — Middleton Reutlinger

(57) ABSTRACT

A filter holding frame that may be used agricultural environments. The filter holding frame may include a plurality of interconnecting members with an upstream hemmed edge and downstream opposing flanges. The opposing flanges of the members may define a sealing face configured for a plurality of air filters. The members of the outer periphery of the filter holding frame may include the mounting surface and the sealing face.

8 Claims, 8 Drawing Sheets

(56) References Cited

U.S. PATENT DOCUMENTS

| | | | |
|---|---|---|---|
| 9,034,068 B2 | 5/2015 | Ball et al. | |
| 9,043,989 B2 | 6/2015 | Devine et al. | |
| 9,049,838 B2 | 6/2015 | Crabtree et al. | |
| 9,049,839 B2 | 6/2015 | Crabtree | |
| 9,185,877 B2 | 11/2015 | Crabtree et al. | |
| 9,510,557 B2 | 12/2016 | Ball et al. | |
| 9,687,766 B2 * | 6/2017 | Crabtree et al. | |
| 2004/0154273 A1 * | 8/2004 | Stephan | B01D 46/0005 55/495 |
| 2007/0220851 A1 * | 9/2007 | Parker | B01D 46/0013 55/484 |
| 2010/0192528 A1 | 8/2010 | Mann et al. | |
| 2010/0229514 A1 * | 9/2010 | Ayshford | B01D 46/0005 55/482 |
| 2012/0291406 A1 * | 11/2012 | Crabtree | B01D 46/0005 55/350.1 |
| 2015/0265959 A1 | 9/2015 | Crabtree et al. | |
| 2017/0363318 A1 * | 12/2017 | White | B01D 46/0002 |

OTHER PUBLICATIONS

American Air Filter Company, Inc., "FASeal Frame," American Air Filter Company, Inc., Retrieved from: https://www.aafintl.com/en/commercial/browse-products/commercial/frames-and-latches/faseal, dated Jan. 31, 2017.
Communication issued in European Application No. 18733146 Jan. 14, 2020.

* cited by examiner

FILTER HOLDING FRAME

BACKGROUND

The present embodiments relate to a filter holding frame, with particular embodiments shown for a filter holding frame for an agricultural environment.

Typical filter frames for swine and poultry environments may allow bypass air around the one or more filters that may lead to contaminants such as, but is not limited to, viruses to be transmitted into or between animal environments. Thus, there is a need for one or more filter holding frames that may reduce air bypass, reduce the compromising or breaking of the sealing face or surfaces, reduce or remove the use of internal stiffening supports, and/or withstand harsh environmental conditions. Harsh environmental conditions may include, but is not limited to, temperature variations.

SUMMARY

In some embodiments of the invention, for example, a filter holding frame may include a plurality of filter cells defined by a plurality of vertical support panels and a plurality of horizontal support panels. In various embodiments, the filter holding frame may include a plurality of latches coupled to at least one of the plurality of vertical support panels and the plurality of horizontal support panels to position at least one filter in the plurality of filter cells. Moreover, in some embodiments, the plurality of vertical support panels and the plurality of horizontal support panels may include an upstream hemmed edge and downstream opposing flanges. In various embodiments, the downstream opposing flanges within each of the filter cells may define a sealing face. In some embodiments, the downstream opposing flanges may define an outer periphery of the filter holding frame.

In various embodiments, the downstream flanges defining the sealing face may be in a non-overlapping engagement. In some embodiments, the downstream opposing flanges defining the outer periphery and the sealing face are substantially in the same plane. In various embodiments, the filter holding frame may be in combination with a plurality of filters. In addition, in various embodiments, each of the vertical support panel and the horizontal support panel includes a slot to receive the other of the vertical support panel and the horizontal support panel. Moreover, in some embodiments, the slot of one of the vertical support panel and the horizontal support panel may extend from the upstream hemmed edge towards the downstream opposing flanges, and the slot of the other one of the vertical support panel and the horizontal support panel may extend from the downstream opposing flanges towards the upstream hemmed edge. In various embodiments, the slot extending from the downstream opposing flanges towards the upstream hemmed edge may include a first portion adjacent the downstream opposing flanges and a second portion adjacent the upstream hemmed edge. In some embodiments, the first portion may be wider than the second portion.

In some embodiments, a filter holding frame may include a plurality of intersecting members defining an outer periphery of the filter holding frame and a plurality of filter cells. In various embodiments, each member may include an upstream hemmed edge extending towards downstream opposing flanges. Moreover, in some embodiments, the downstream opposing flanges may extend outwardly away from the hemmed edge. In addition, in various embodiments, the downstream opposing flanges may define the outer periphery of the filter holding frame and a sealing face within each filter cell.

In various embodiments, the filter holding frame may include a plurality of latches coupled to the plurality of members to position a plurality of filters. In some embodiments, the plurality of latches may include a spring clip. In various embodiments, the plurality of downstream opposing flanges within each filter cell may be butt welded to each other to create a substantially planar sealing face. In some embodiments, at least one of the members defining the filter cell may include a slot extending from the downstream opposing flanges towards the upstream hemmed edge to receive another member. In various embodiments, the slot may include a first portion of at least one of the downstream opposing flanges, wherein the first portion of the slot receives a second portion of at least one of the downstream opposing flanges of another intersecting member. Moreover in some embodiments, the slot may include a first portion of at least one of the downstream opposing flanges and a second portion within the upstream hemmed edge, wherein the first portion is wider than the second portion. In various embodiments, the filter holding frame is made of stainless steel.

In addition, in various embodiments, a filter holding system may include a filter holding frame having an outer periphery and configured to support a plurality of filters. In some embodiments, each filter holding frame may include a plurality of filter cells defined by a plurality of intersecting members. Moreover, in various embodiments, each member may include an upstream hemmed edge and downstream opposing flanges. In some embodiments, the downstream opposing flanges may extend outwardly away from the hemmed edge. In various embodiments, a plurality of the downstream opposing flanges defining the outer periphery of the filter holding frame may combine to provide a structural mounting surface. In some embodiments a plurality of the downstream opposing flanges within each filter cell may define a sealing face.

In various embodiments, the filter holding system may include a plurality of latches coupled to the plurality of members to position the plurality of filters. In some embodiments, the plurality of latches may include a spring clip. In addition, in various embodiments, the plurality of downstream opposing flanges within each filter cell are butt welded to each other to create a substantially planar sealing face. In some embodiments, at least one member defining the filter cell may include a slot extending from the downstream opposing flanges towards the upstream hemmed edge to receive another member. In various embodiments, the slot may include a first portion of at least one of the downstream opposing flanges, wherein the first portion of the slot receives a second portion of at least one of the downstream opposing flanges of another intersecting member. Moreover, in some embodiments, the slot may include a first portion of at least one of the downstream opposing flanges and a second portion within the upstream hemmed edge, wherein the first portion may be wider than the second portion.

These and other advantages and features, which characterize the embodiments, are set forth in the claims annexed hereto and form a further part hereof. However, for a better understanding of the embodiments, and of the advantages and objectives attained through its use, reference should be made to the drawings and to the accompanying descriptive matter, in which there are described example embodiments. This summary is merely provided to introduce a selection of concepts that are further described below in the detailed description, and is not intended to identify key or essential features of the claimed subject matter, nor is it intended to be used to limit the scope of claimed subject matter, nor to define the field of endeavor.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques for a filter holding frame 20, such as the type that may be used in an agricultural environment such as, but is not limited to, structures for housing swine and poultry, or in other similar applications. However, it will be appreciated that the herein-described apparatus and techniques may also be used in connection with other types of filter holding systems in some embodiments. For example, the herein-described apparatus and techniques may be used in commercial and/or residential applications in some embodiments. Moreover, the herein-described apparatus and techniques may be used in connection with a variety of filter configurations and/or characteristics.

Figure 1:
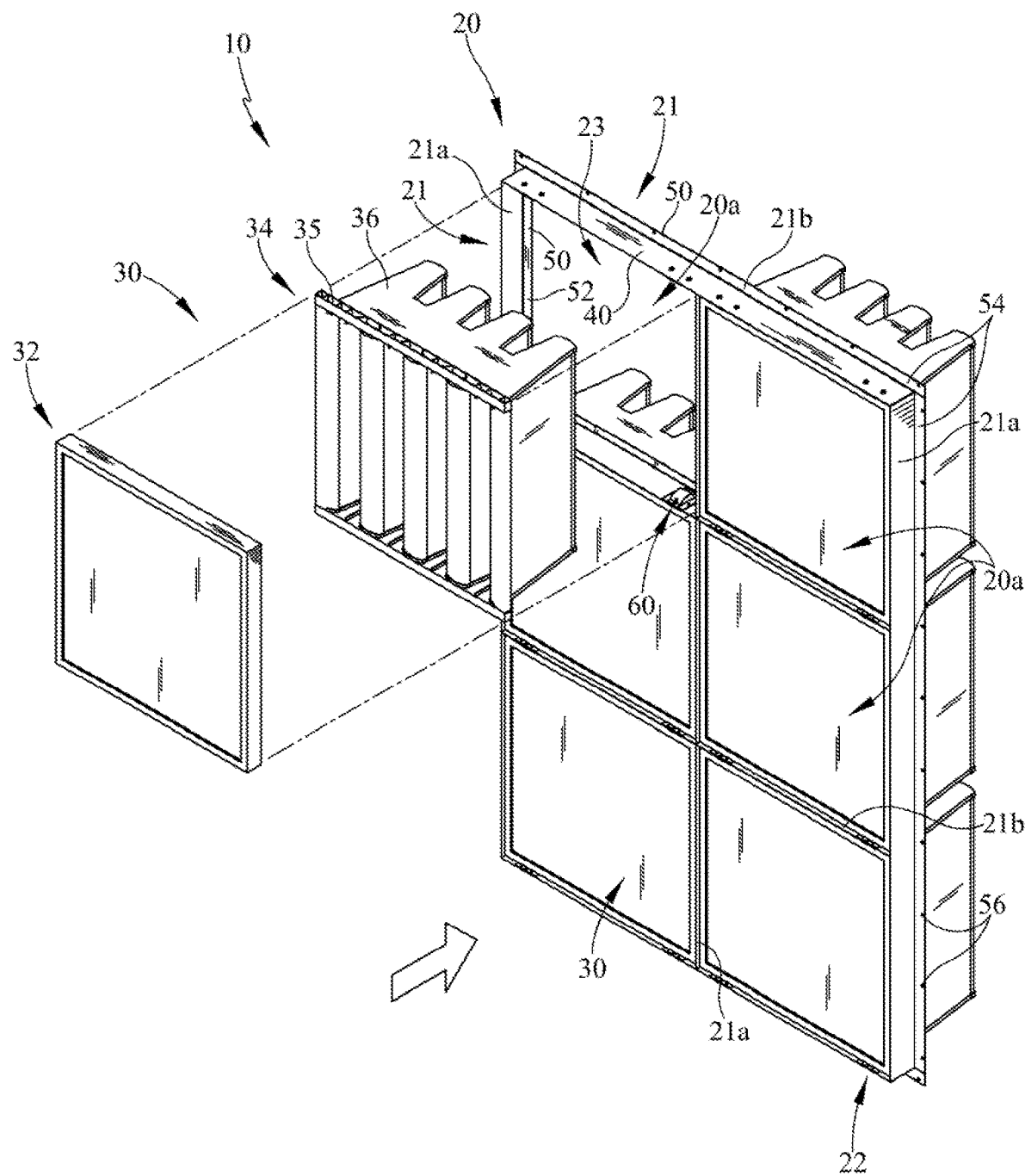
FIG. 1 is a perspective view of one embodiment of a filter holding frame illustrating an embodiment of a prefilter and final filter exploded away therefrom.
Figures 2, 3:
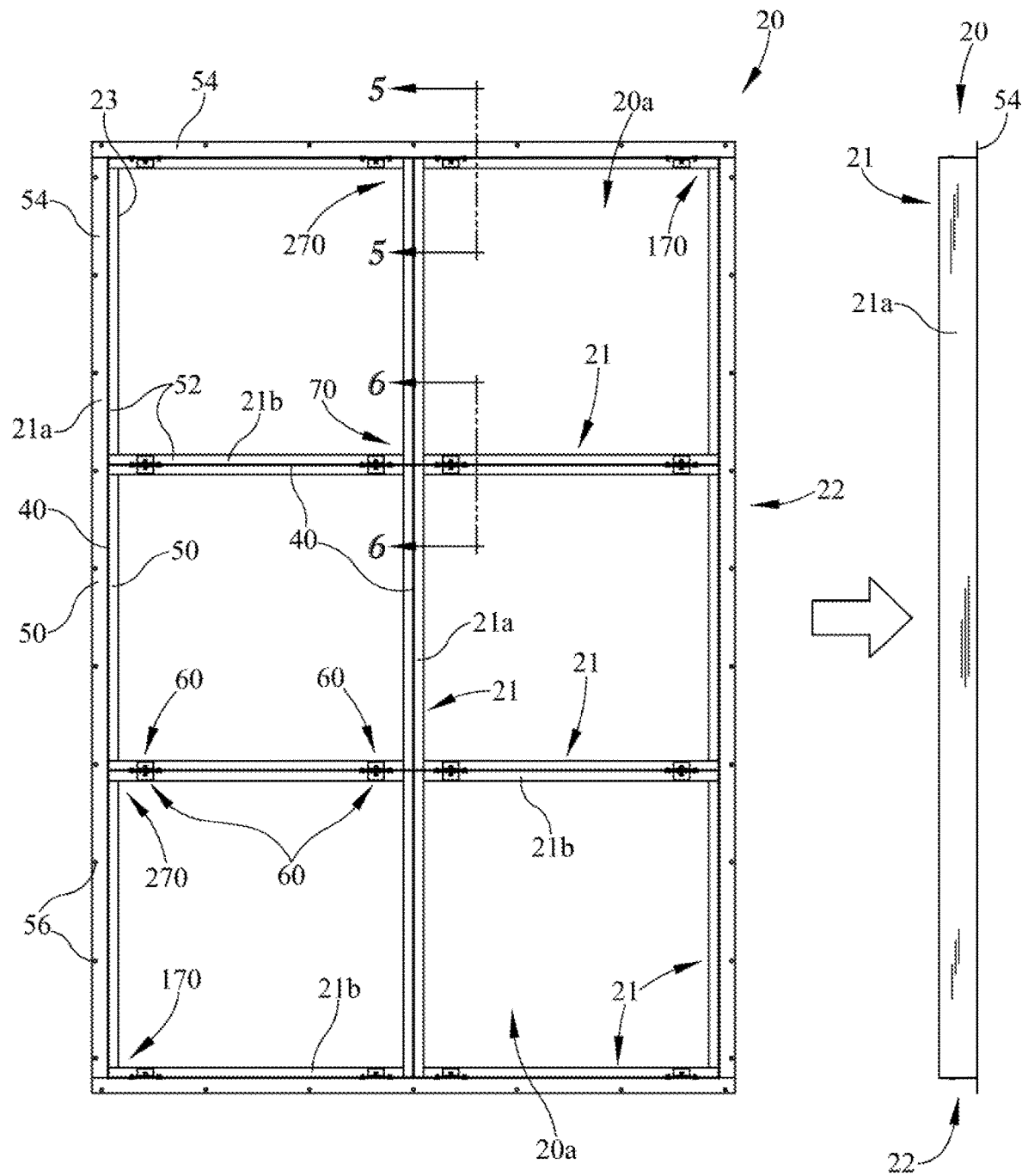
FIG. 2 is a front or upstream view of the filter holding frame of FIG. 1.
FIG. 3 is a side view of the filter holding frame of FIG. 2.
Figure 4:
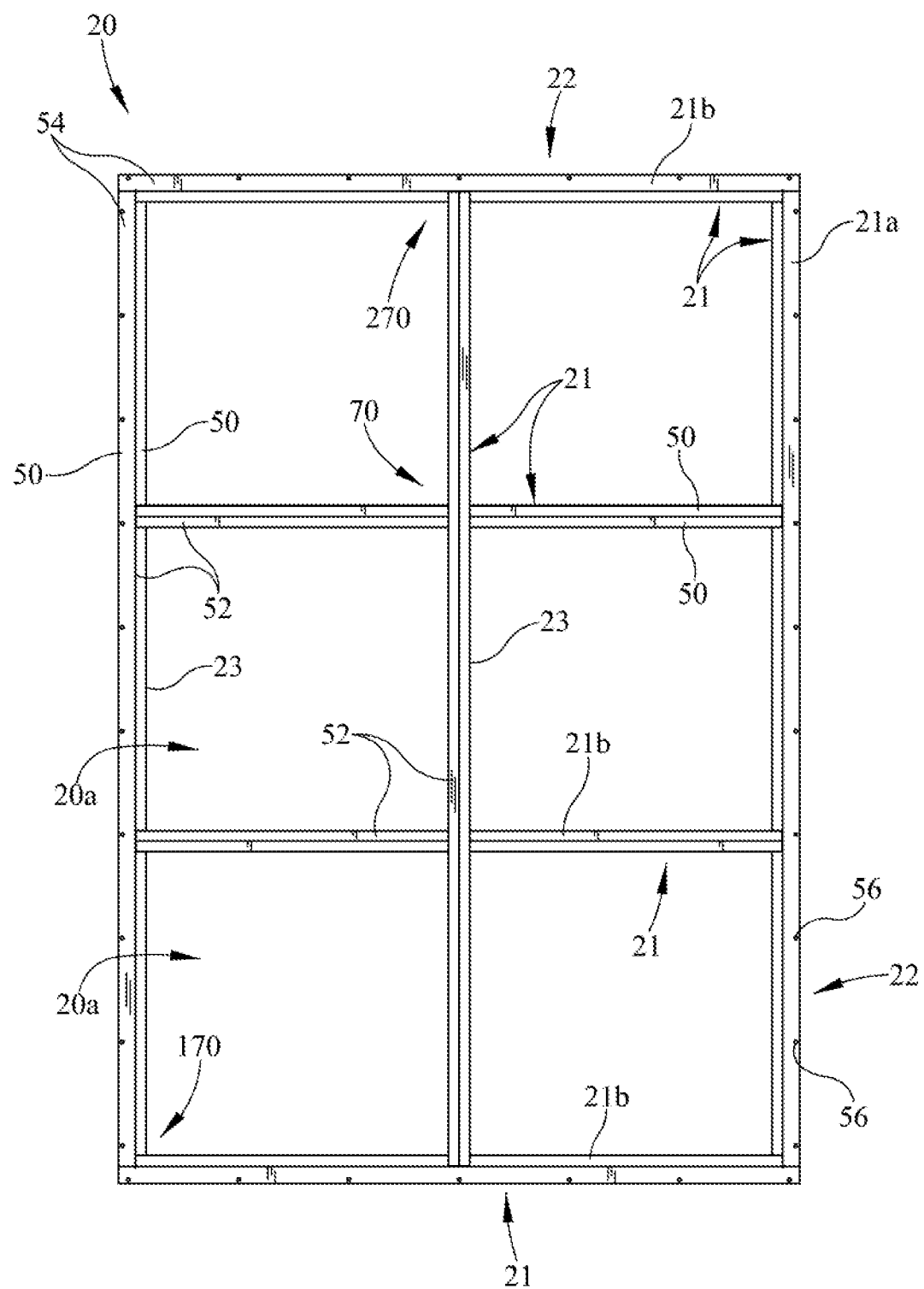
FIG. 4 is a back or downstream view of the filter holding frame of FIG. 1.

Turning now to the drawings, wherein like numbers denote like parts throughout the several views, FIG. 1 illustrates an example filter holding frame 20 in which the various technologies and techniques described herein may be implemented. Filter holding frame 20 includes a plurality of intersecting members 21 that define one or more filter cells 20a. The members 21, serve in part, as dividers between the filter cells 20a as well as define an outer periphery 22 of the filter support frame 20. In a preferred embodiments, the filter holding frame 20 is made of stainless steel. However, a variety of suitable materials may be used. Each filter cell 20a holds one or more air filters 30. Each filter cell 20a may include an aperture 23 through which an air filter 30 may pass therethough and abut against the sealing face 52 of the filter holding frame 22. The air filter 30 may include a filter body 36 that passes through the aperture 23 and a sealing flange 35 disposed adjacent the upstream end of the air filter 30. The sealing flange cure 35 may be configured to sit within the members 21 of each filter cell 20a and be pressed against the sealing face 52 of the filter holding frame 20. In a preferred embodiment, the filter holding frame 20 may not include a gasket adjacent the sealing face to engage with the air filter. However, the filter holding frame 20 may include a gasket in some embodiments. In some embodiments, the air filter 30 may include a gasket adjacent the sealing flange 35.

As shown in the figures, the plurality of intersecting members 21 define the outer periphery 22 and the plurality of filter cells 20a. In the one embodiment shown, the intersecting members 21 include a plurality of vertical support panels 21a and a plurality of horizontal support panels 21b to create the boundaries of the filter cells 20a and the outer periphery 22. Each member 21 includes an upstream hemmed edge 40 extending towards downstream opposing flanges 50. The upstream hemmed edge 40 is adjacent the upstream portion of the filter holding frame 20 and the downstream opposing flanges 50 are adjacent the downstream portion of the filter holding frame 20. The upstream hemmed edge 40 of the member 21 may at least in part reduce the airflow bypass of the air filter 30 and/or filter holding frame 20. In the one embodiment shown, the upstream hemmed edge 40 is rolled flush or substantially closed to itself and the two distal opposing free ends 51 extend outwardly away from the hemmed edge 40 to define the opposing flanges. One or both of the opposing flanges 50 may be orientated at approximately 90 degrees from the upstream hemmed edge 40 portion of the member 21.

Figure 5:
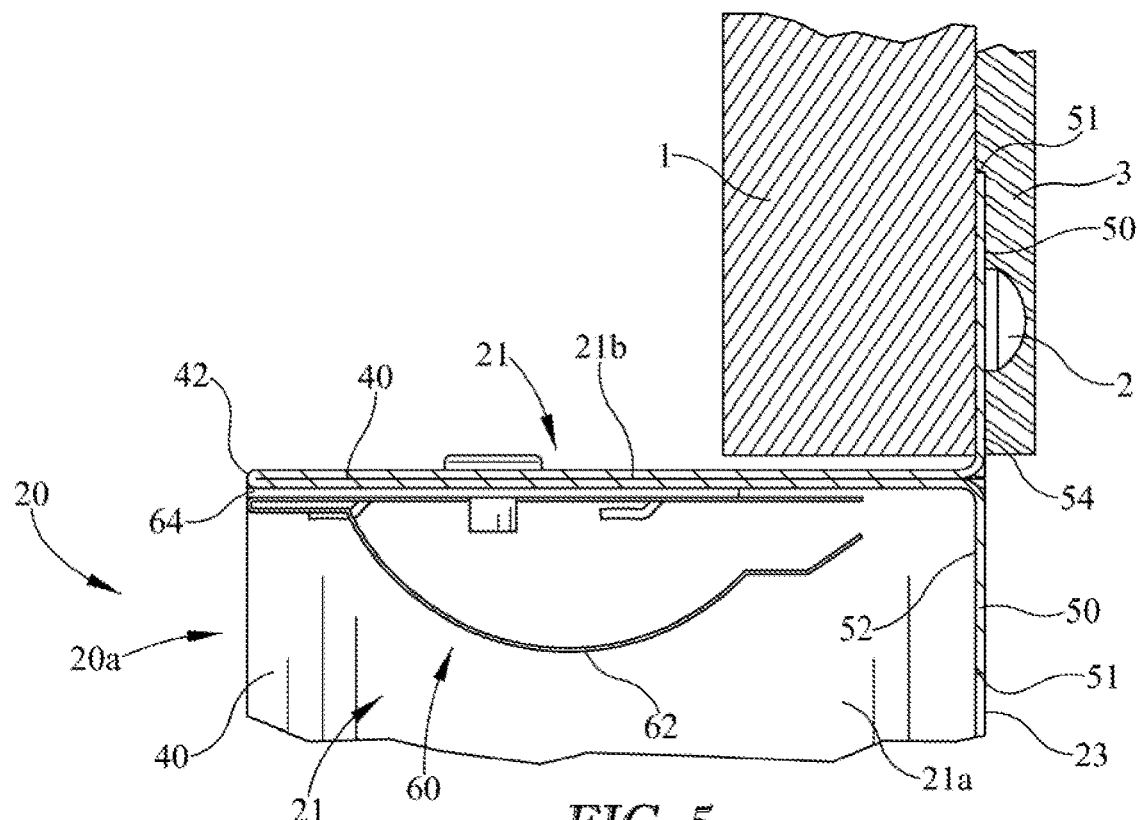
FIG. 5 is a sectional view taken along line 5-5 of FIG. 2.
Figure 6:
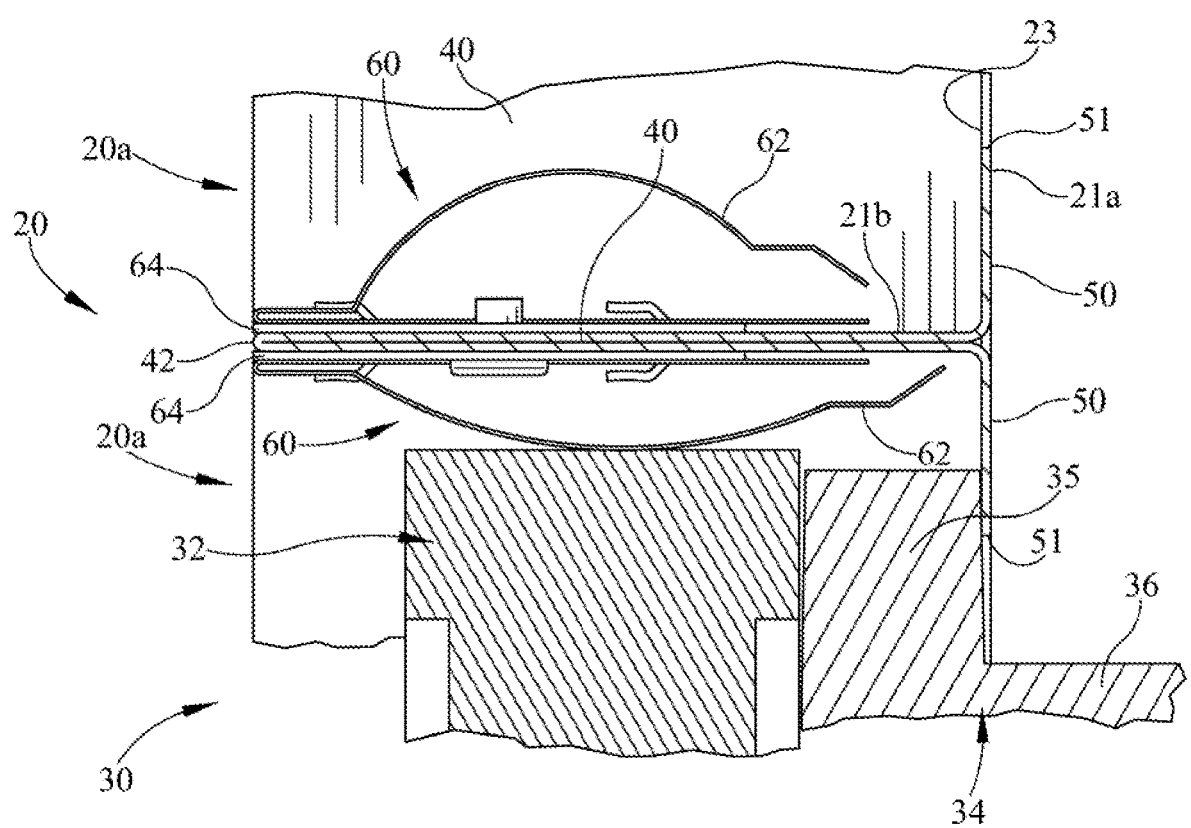
FIG. 6 is a sectional view taken along line 6-6 of FIG. 2.

As shown in FIGS. 1-4, the plurality of members 21 define the outer periphery 22 of the filter holding frame 20. The vertical and horizontal support panels 21a, 21b or members 21 include a plurality of the downstream opposing flanges 50 that define the outer periphery 22. These opposing flanges 50 combine to provide the structural mounting surface 54 of the filter holding frame 20. As shown in one embodiment of FIG. 5, the mounting surface 54 may include a plurality of openings 56 that may receive a plurality of fasteners 2 to secure the frame 20 to the wood frame 1 of the agricultural structure. Moreover in some embodiments, a foam or insulating pad 3 may be subsequently added or overlap the wood frame 1 and/or mounting surface 54 of the filter holding flame 20.

The downstream opposing flanges 50 of the plurality of members 21 define the sealing face 52 or surfaces of each filter cell 20a. The vertical and horizontal support panels 21a, 21b or members 21 that define each filter cell 20a and/or outer periphery 22 combine to position the downstream opposing flanges 50 within each filter cell 20a. The sealing face 52 and/or the mounting surface 54 created by downstream opposing flanges 50 of adjacent members 21 may be in a non-overlapping engagement when combined to each other. The downstream opposing flanges 50 may be butt welded to each other in some embodiments and may not overlap. As a result, the sealing face 52 and/or the mounting surface 54 may be substantially planar and may create an even surface to seal or reduce bypass airflow. In some embodiments, welding between members 21 and/or the sealing faces 52 may be on the downstream side thereof to further reduce an uneven surfaces. Moreover in various embodiments, the downstream opposing flanges 50 of the outer periphery 22 may be welded on the downstream side to provide an even or planar upstream surface abutting the wood frame 1. It should be understood that the flanges may overlap in some embodiments. Further in the one embodiment as shown, the downstream opposing flanges 50 that define the mounting surface 54/outer periphery 22 and the sealing face 52 are substantially in the same plane.

In some embodiments, the filter holding frame 20 may include a plurality of fasteners or latches 60 may be used to secure and position the one or more filters 30 within each filter cell 20*a*. As shown in the figures, the one or more latches 60 may hold the filters 30 within the filter holding frame 20 and provide sufficient compression to the sealing face 52 to provide for an airtight seal between the filter 30 and the sealing face 52. In various embodiments, the latches 60 are secured to one or more members 21, or more specifically in some embodiments the horizontal support panels 21*b*. In the one embodiment shown, a spring clip 62 may be riveted to the hemmed edge 40 and used to hold the prefilter 32 and/or final filter 34. For example in some embodiments, the spring clip 62 may be the FASEAL spring clip available from American Air Filter Company, Inc. In some embodiments, an intermediate bracket 64 with projecting locking tabs may be used to attach the spring clip 62 to the member 21. It should be understood that a variety of fasteners or latches may be used to secure the filter 30 with the filter holding frame 20.

Figure 7:
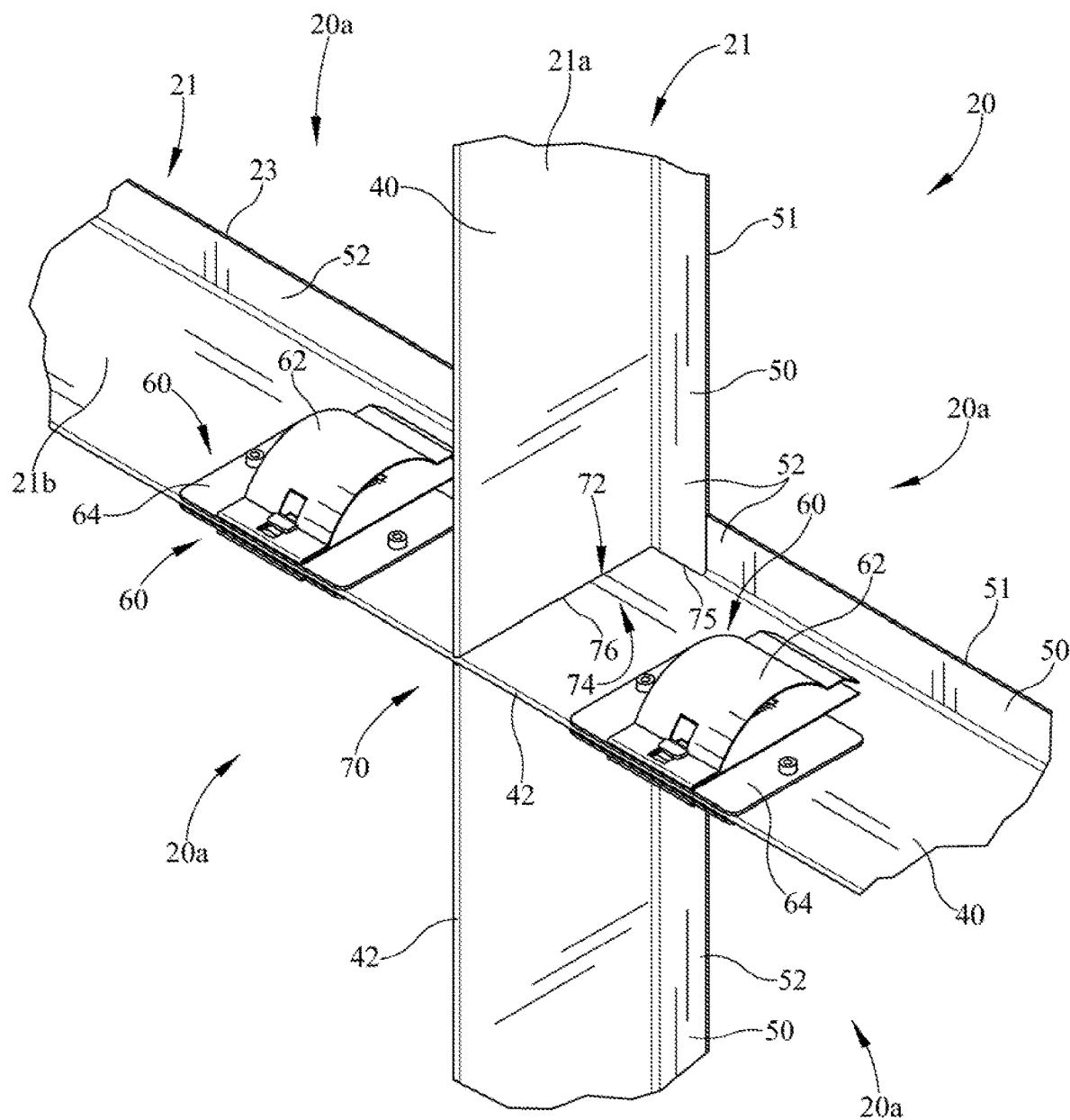
FIG. 7 is a perspective view of the assembled intersecting members within the outer periphery of the filter holding frame of FIG. 2.
Figure 8:
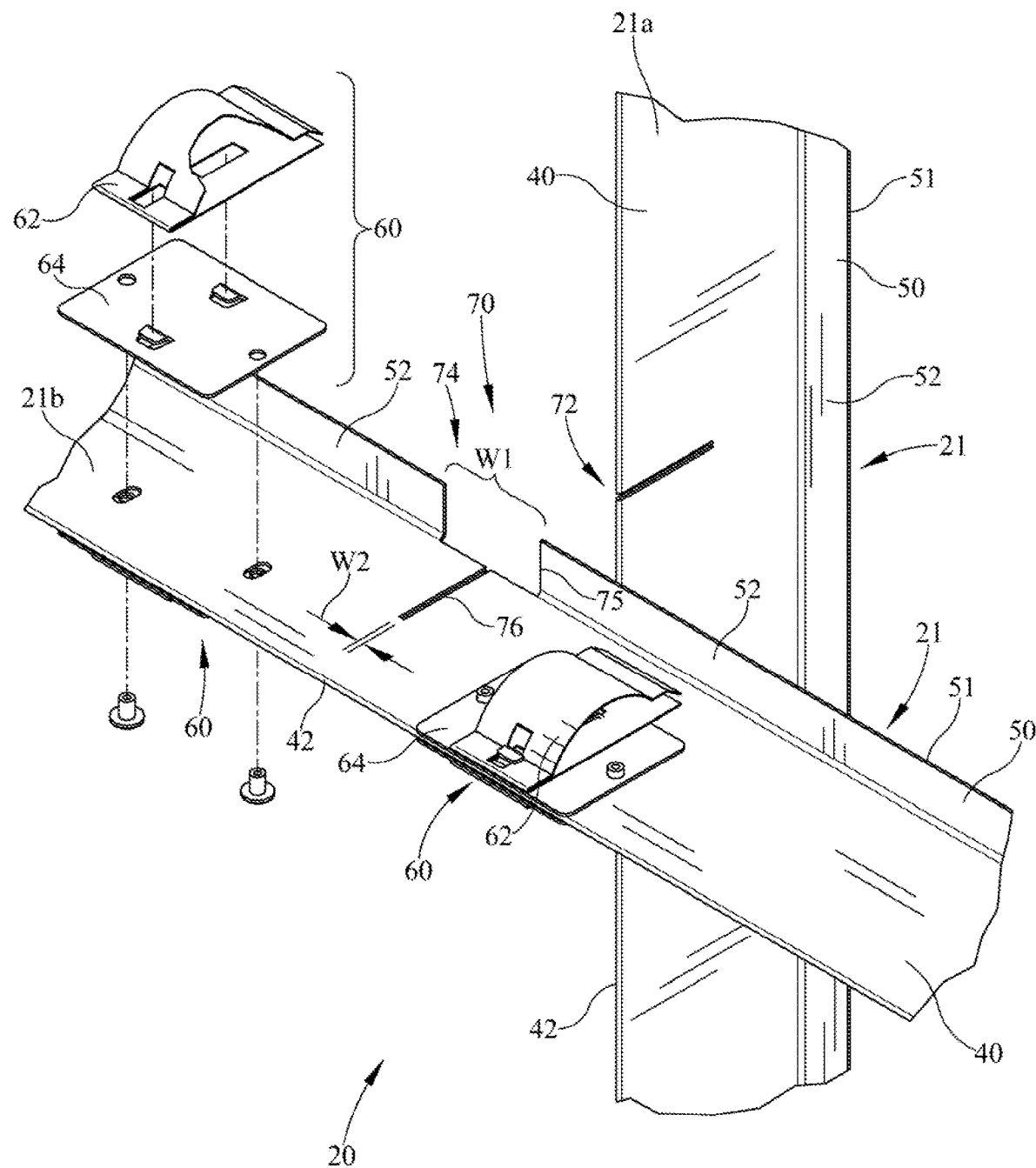
FIG. 8 is a perspective view of the intersecting members of FIG. 7 exploded away from each other illustrating the respective receiving slots of each member.

In some embodiments as shown in FIGS. 7-10, the plurality of intersecting members 21 may include a joint 70 that may be slotted or notched to engage with each other. The one or more slots may be within one or both of the vertical support panel 21*a* and the horizontal support panel 21*b*. In the embodiment shown in FIGS. 7 and 8, the vertical support panel and the horizontal support panel 21*a*, 21*b* are notched or slotted. The vertical support panel 21*a* includes a slot 72 extending from the upstream hemmed edge 40 towards the downstream opposing flanges 50, or stated alternatively from upstream to downstream. The slot 72 receives the upstream hemmed edge 40 of the horizontal support panel 21*b* when assembled as shown in FIG. 7. This slot is about the width/thickness of the hemmed edge 40, or about the double the thickness of the sheet metal. The horizontal support panel 21*b* includes a slot 74 extending from the downstream opposing flanges 50 towards the upstream end or closed end 42 of the upstream hemmed edge 40, or stated alternatively from downstream to upstream. The slot 74 receives a portion of the upstream hemmed edge 40 and a portion of the downstream opposing flanges 50 of the vertical support panel 21*a*. The slot or notch 74 of the horizontal support panel 21*b* includes a first portion 75 adjacent or within the downstream opposing flanges 50 and a second portion 76 adjacent or within the upstream hemmed edge 40. The first portion 75 being wider than the second portion 76 of the slot 74. The first portion 75 includes a width W1 to receive the lateral or outwardly extending extents between the two distal opposing free ends 51 of the downstream opposing flanges 50. The second portion 76 includes a width W2 to receive the hemmed edge 40 of the vertical support panel 21*a*. The slots 72, 74 of the respective members 21 may be in different or perpendicular planes as shown. It should be understood that the slots of the relative vertical and horizontal panels 21*a*, 21*b* may be reversed in some embodiments such that the horizontal support panel 21*b* may be slid into engagement from the downstream side of the vertical support panel 21*a* instead of from the upstream side as shown in FIG. 8. When assembled as shown in FIG. 7, the ends of the opposing flanges, within the slots and/or distal opposing free ends 51, in engagement may be butt welded to create a smooth or flat sealing face 52. Moreover in various embodiments, the members 21 may be caulked and/or welded together, on upstream and/or downstream sides. The joints 70 between members 21 may be sealed with a polyurethane caulking for example.

Figure 9:
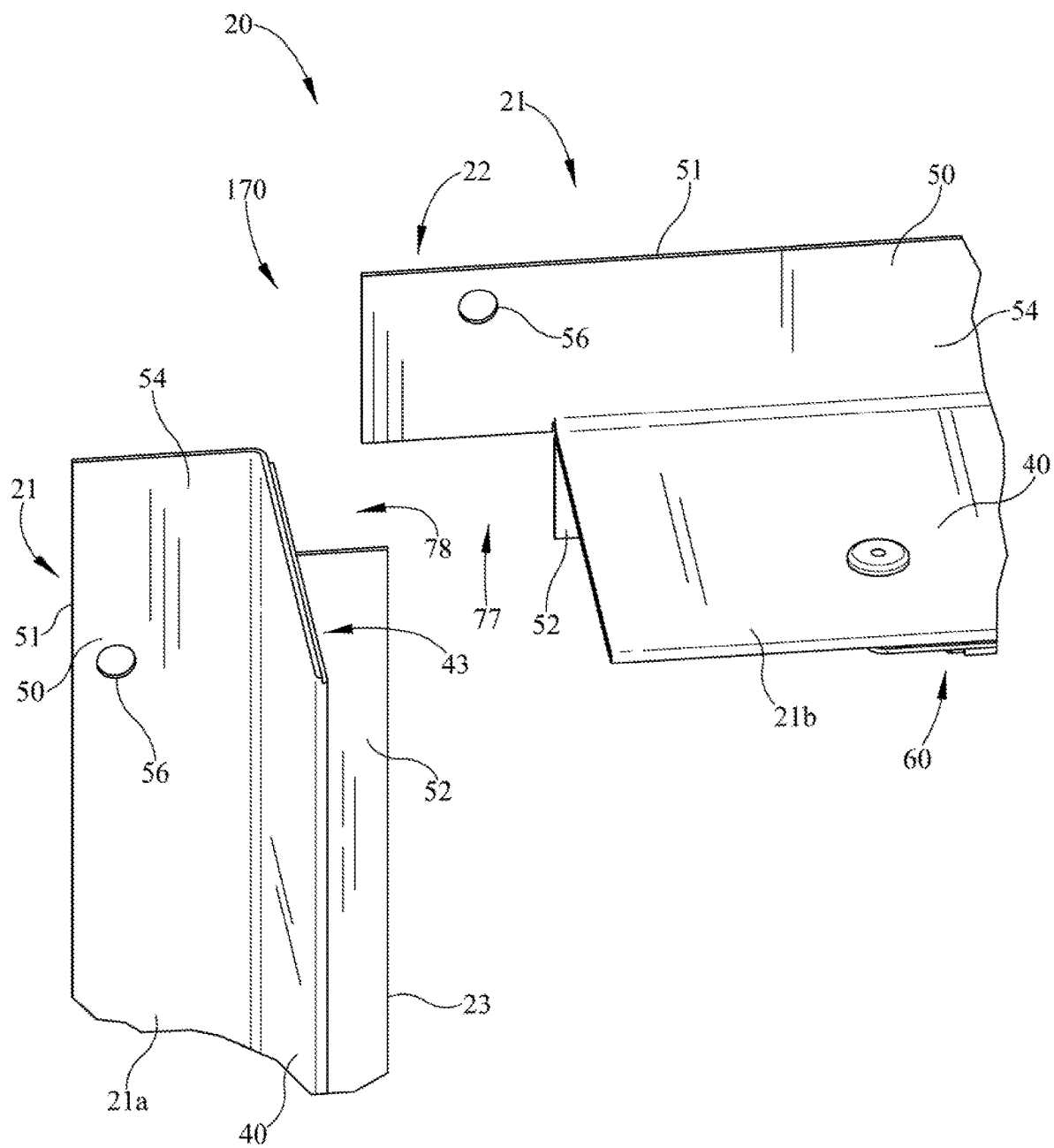
FIG. 9 is a perspective view of the intersecting members of a corner of the outer periphery of the filter holding frame of FIG. 2 exploded away from each other illustrating the respective receiving slots of each member.
Figure 10:
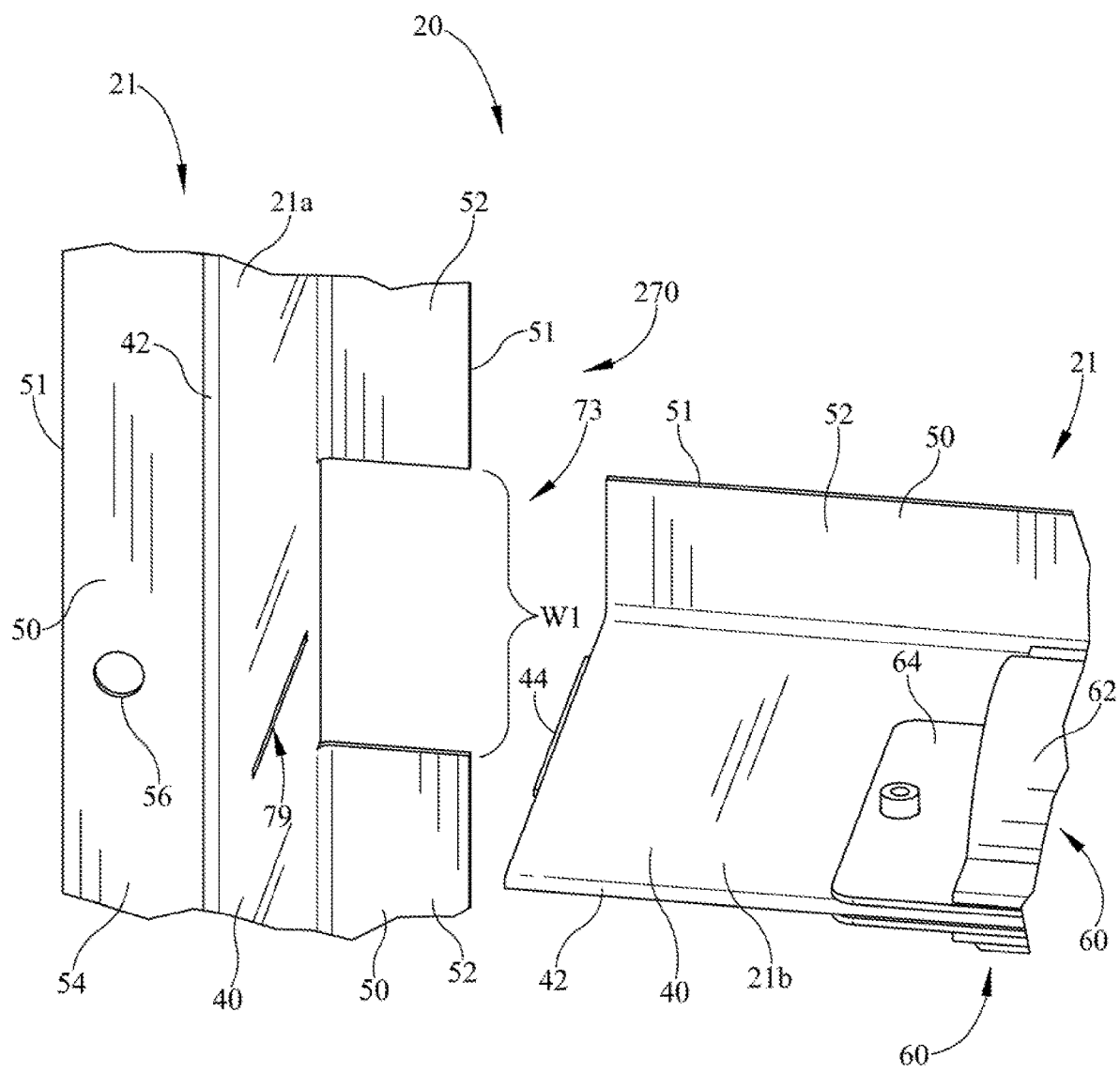
FIG. 10 is a perspective view of the intersecting members of a T-shaped joint of the outer periphery of the filter holding frame of FIG. 2 exploded away from each other illustrating the respective receiving slots of each member.

A illustrated in FIGS. 9 and 10, the joints 70 between members may include a variety of configurations and constructions. The slots may extend from inside the member outwardly for a distance towards the exterior of the member 21 or outer periphery 22 in relation to the filter cell. For example, the slots may extend through the interior opposing flange 50 defining the sealing face 52 and/or extend up to the hemmed edge or include portions of the hemmed edge. In FIG. 9, the outer periphery 22 of the filter holding frame 20 may include a joint 170 with the ends of a vertical support panel 21*a* and the horizontal support panel 21*b*. Each end of the members 21 may include an interior downstream opposing flange 50 or sealing face 52 that is slotted out. As shown in FIG. 9, the slot 77 of the horizontal support panel 21*b* extends through the sealing face 52 and the hemmed edge 40 and ends adjacent the mounting surface 54. In some embodiments, the slot may include a first portion of at least one of the downstream opposing flanges 50 or both. The slot 78 of the vertical support panel 21*a* extends through the sealing face 54 and one wall of the hemmed edge 40, thereby creating a step 43. Step 43 receives a portion of the hemmed edge 40 of the vertical support panel 21*b*. However, a step may not be used in some embodiments. Further, in some embodiments the slots may be discontinuous between or separated from each other or positioned within one or more of the opposing flanges and/or hemmed edges. Moreover, the exterior opposing flange or mounting surface 54 of the horizontal support panel 21*b* extends beyond the extent of the upstream hemmed edge of the vertical support panel 21*a*.

As shown in FIG. 10, the intersecting joint 270 between members occurs between the opposing ends of the vertical support panel 21*a* and one end of a horizontal support panel 21*b*. The horizontal support panel 21*b* includes a tab 44 extending in the same plane of the upstream hemmed edge 40, one or both sheets of the hemmed edge, and engages a first slot 79 within the upstream hemmed edge 40 within the vertical support panel 21*a*. A slot 73 within the interior opposing flange 50 of sealing face 52 of the upstream support panel 21*a* includes a W2 to receive the lateral extent between the downstream opposing flanges 50 of the horizontal support panel 21*b*. It should be understood that the joints of the intersecting members may be a variety of sealed connections and still be within the scope of the teachings herein.

The members 21 of the filter holding frame 20 may be similarly made to increase production efficiency. In various embodiment, sheet metal such as stainless is hemmed on the upstream end with the opposing flanges bent to the desired orientation. The members 21 defining the outer periphery 22 and/or the filter cells may include the upstream hemmed edges to reduce the air bypass. In some embodiments, the vertical support panel 21*a* and horizontal support panel 21*b* may cut to length from the same or substantially similar stock of hemmed sheet metal and fabricated opposing flanges. The stock of hemmed members may be differentiated to create horizontal or vertical members by downstream manufacturing steps of cutting to length, joint formation such as the slots, tabs, etc., fastener attachment location and assembly, and/or creating the mounting openings within the mounting surface of the outer periphery. Individual members 21 are shown in the one embodiment to be manufactured from a single piece of sheet metal to reduce air bypass. Moreover, the horizontal and/or vertical support panels in embodiments span across several filter cells thereby reducing the number of separate pieces for an array. The step of welding the members 21 together at the joints or other locations may involve a variety of upstream and/or downstream welds. In some embodiments, the downstream side of the sealing face 52 may be welded to create a smooth upstream face for the filter 30 to seal upon. The welds may by at the abutment of the end portions of the members in some embodiments. Non-overlapping engagement of flanges in some embodiments may reduce the uneven contact with the filter holding frame and the filters and/or application structure. Downstream welds on the downstream sides of the members 21 and/or filter holding frame 20 may reduce air bypass. The welds or engagements between members may also include caulking in some embodiments. Installing the filter holding frame 20 within the opening of the wood framing 1 in some embodiments may include the step of engaging the upstream side of the mounting surface 54 to downstream side of the frame 1 and subsequently securing with a variety of fasteners 2. In some embodiments, the step of adding the insulating paneling or the foam pad 3 over the mounting surface 54 may reduce air bypass about the frame and wood engagement. In some embodiments of the installation of the filter holding frame may include the step of securing one or more filters 30 within one or more filter cells 20*a*. In some embodiments when one or more latches 60, such as but not limited to the spring clips 62, are combined with the filter holding frame 20, a gasket, if used, of the final filter 34 may be secured and pressure sealed to the sealing face 52.

As shown in the Figures, the embodiment of the filter holding frame 20 is shown herein for ease of understanding. For example, the filter holding frame 20 may be combined with a variety of filters 30 to create a variety of arrays in a filter frame system 10. The filters 30 remove contaminants such as dirt, dust, moisture, salt, carbon, viruses, and/or other contaminants from the air flowing therethrough that may tend to harm the desired environment and/or habitat of the livestock. One or more filter holding frames 20 with a variety of filters 30 may be used in a variety of applications. The filter holding frame 20 may be a variety of sizes and arrangements, such as varying the quantity of filter cells defines and/or array. In the one embodiment shown, the array is 2 by 3 filter cell arrangement. Moreover, the filters 30 may include a pre-filter 32 and a final filter 34. The filters 30 may be any suitable type or size, such as a V-bank filter 34 and a pre-filter 32 as shown. The latches 60 used may be configured to accept multiple filter designs and still be within the scope of the invention. Implementation of the herein-described apparatus and techniques within a variety of applications would be well within the abilities of one of ordinary skill in the art having the benefit of the instant disclosure, so the invention is not limited to the agricultural implementation discussed herein.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.01.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A filter holding frame comprising:
a plurality of filter cells defined by a plurality of vertical support panels and a plurality of horizontal support panels;
a plurality of latches coupled to at least one of said plurality of vertical support panels and said plurality of horizontal support panels to position at least one filter in said plurality of filter cells; and
said plurality of vertical support panels and said plurality of horizontal support panels includes an upstream hemmed edge and downstream opposing flanges, wherein said downstream opposing flanges within each of said filter cells define a sealing face and said downstream opposing flanges define an outer periphery of said filter holding frame;
wherein at least one of the plurality of horizontal support panels downstream opposing flanges have a notch with a first portion and a second portion, the first portion of the notch being wider than the second portion, the second portion of the notch formed within the upstream hemmed edge;
wherein the first portion includes a first portion width sized to receive outwardly extending extents of the downstream opposing flanges of the vertical support panels;
and
wherein at least one of the plurality of vertical support panels has a slot to receive the upstream hemmed edge of the horizontal support panels.

2. The filter holding frame of claim 1 wherein said downstream flanges defining said sealing face are in a non-overlapping engagement.

3. The filter holding frame of claim 1 wherein said downstream opposing flanges defining said outer periphery and said sealing face are substantially in the same plane.

4. The filter holding frame of claim 1 in combination with a plurality of filters.

5. The filter holding frame of claim 1 wherein each of said horizontal support panel includes a slot to receive the other of said vertical support panel.

6. The filter holding frame of claim 5 wherein said slot of one of said vertical support panel and said horizontal support panel extends from said upstream hemmed edge towards said downstream opposing flanges, and said slot of the other one of said vertical support panel and said horizontal support panel extends from said downstream opposing flanges towards said upstream hemmed edge.

7. The filter holding frame of claim 1 wherein said plurality of latches includes a spring clip.

8. The filter holding frame of claim 7 wherein said plurality of latches includes a plurality of intermediate brackets, wherein said intermediate bracket attaches said spring clip to said at least one of said plurality of vertical support panels and said plurality of horizontal support panels.

* * * * *